US011017772B1

United States Patent
Gill et al.

(10) Patent No.: US 11,017,772 B1
(45) Date of Patent: May 25, 2021

(54) NATURAL LANGUAGE PROGRAMMING

(71) Applicant: Josh.ai, Inc., Denver, CO (US)

(72) Inventors: Timothy Earl Gill, Denver, CO (US); Alex Nathan Capecelatro, Los Angeles, CA (US)

(73) Assignee: Josh.ai, Inc., Denver, CO (US)

( * ) Notice: Subject to any disclaimer, the term of this patent is extended or adjusted under 35 U.S.C. 154(b) by 48 days.

(21) Appl. No.: 16/427,060

(22) Filed: May 30, 2019

(51) Int. Cl.
| | | |
|---|---|---|
| *G10L 15/00* | (2013.01) | |
| *G10L 15/26* | (2006.01) | |
| *G10L 25/00* | (2013.01) | |
| *G10L 13/00* | (2006.01) | |
| *G10L 15/22* | (2006.01) | |
| *G10L 15/18* | (2013.01) | |

(52) U.S. Cl.
CPC .......... *G10L 15/22* (2013.01); *G10L 15/1815* (2013.01); *G10L 15/1822* (2013.01); *G10L 2015/223* (2013.01)

(58) Field of Classification Search
CPC ... G10L 15/00; G10L 15/005; G10L 15/1815; G10L 15/1822; G10L 15/22; G10L 2015/223; G10L 21/06; G10L 21/10
USPC ............ 704/9, 200, 235, 246, 257, 260, 276
See application file for complete search history.

(56) References Cited

U.S. PATENT DOCUMENTS

| | | | | |
|---|---|---|---|---|
| 7,725,829 B1 * | 5/2010 | Wong | .................... | G11B 27/105 715/726 |
| 10,147,306 B2 * | 12/2018 | Kinney | .................. | G08B 29/02 |
| 10,403,275 B1 * | 9/2019 | Gill | ......................... | G10L 15/22 |
| 10,546,486 B2 * | 1/2020 | Kinney | .............. | G06K 9/00362 |
| 10,663,938 B2 * | 5/2020 | Rexach | ............ | G01N 35/00871 |
| 10,714,087 B2 * | 7/2020 | Gill | ........................ | G06F 40/253 |
| 2003/0040812 A1 * | 2/2003 | Gonzales | ............. | G05B 19/042 700/19 |
| 2012/0128241 A1 * | 5/2012 | Jung | ...................... | H04N 21/84 382/165 |
| 2014/0047328 A1 * | 2/2014 | Ruble | ................. | G06F 3/04842 715/256 |
| 2018/0144615 A1 * | 5/2018 | Kinney | .................... | G07C 9/00 |
| 2018/0322300 A1 * | 11/2018 | Segal | ........................ | G06K 9/22 |
| 2018/0323991 A1 * | 11/2018 | Segal | ....................... | G10L 15/22 |
| 2018/0323996 A1 * | 11/2018 | Roman | .................. | H04L 12/2818 |
| 2019/0089550 A1 * | 3/2019 | Rexach | .................... | G10L 15/22 |
| 2019/0090056 A1 * | 3/2019 | Rexach | .................... | G06F 3/167 |
| 2019/0120809 A1 * | 4/2019 | Rexach | ................. | H04R 3/005 |
| 2019/0146438 A1 * | 5/2019 | Rexach | .............. | G01N 33/1826 700/275 |
| 2019/0180603 A1 * | 6/2019 | Kinney | .................... | G10L 15/22 |
| 2019/0229943 A1 * | 7/2019 | Edwards | ............. | H04L 12/2829 |
| 2020/0007356 A1 * | 1/2020 | Mason | ................. | H05B 47/155 |

(Continued)

*Primary Examiner* — Khai N. Nguyen
(74) *Attorney, Agent, or Firm* — Van Pelt, Yi & James LLP

(57) ABSTRACT

Audio content associated with a received verbal utterance is received. An operational meaning of the received verbal utterance comprising a compound input is recognized and determined at least in part by: determining that a first subset of the received verbal utterance is associated with a first recognized input; determining that a second subset of the received verbal utterance is associated with a second recognized input; and storing data that associates with a scene identifier a set of commands that includes a first command associated with the first recognized input and a second command associated with the second recognized input.

20 Claims, 10 Drawing Sheets

(56) References Cited

U.S. PATENT DOCUMENTS

2020/0051556 A1\* 2/2020 Gill ..................... G10L 15/22
2020/0175983 A1\* 6/2020 Goodman ............. G06F 9/453

\* cited by examiner

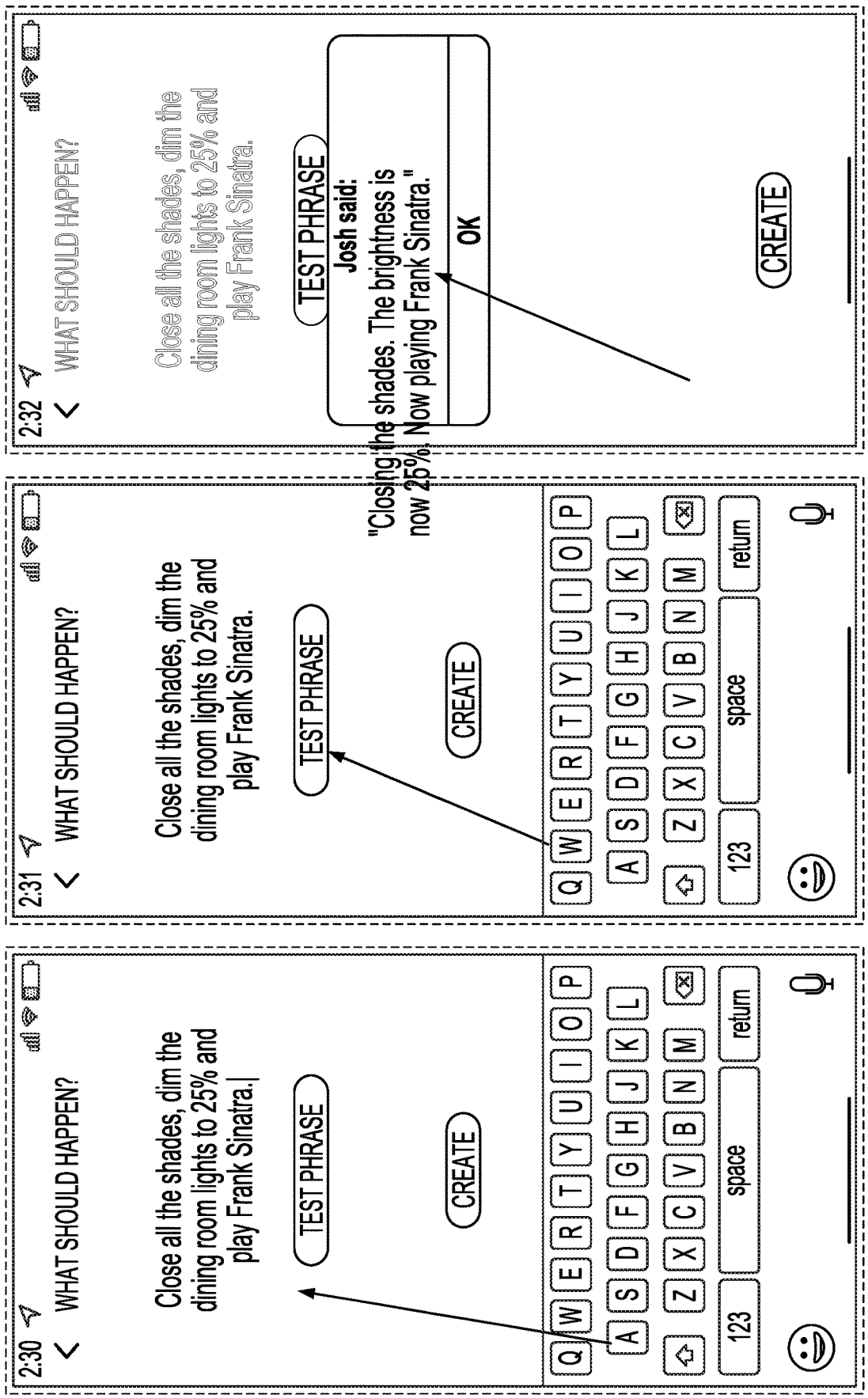

NATURAL LANGUAGE PROGRAMMING

BACKGROUND OF THE INVENTION

Computer programming includes designing and building a sequence of logical and/or arithmetic instructions to be executed by a computer machine. The instructions conform to a computer programming language, a formal language as referred to herein as a language well-formed by words, letters, and alphabets, and often defined by a formal grammar.

By contrast to a computer programming language, a natural human language or natural language as referred to herein, such as English, Russian, Chinese, or sign language, was developed to aid human communication. Unlike natural language, a formal language is a system for encoding and/or decoding information.

Making computer programming easier would allow more people the ability to build custom programs for their individual needs. One example of a custom program is a scene in smart home automation, which sets at least one smart home device to a specific setting.

BRIEF DESCRIPTION OF THE DRAWINGS

Various embodiments of the invention are disclosed in the following detailed description and the accompanying drawings.

FIGS. 4A-4J are a series of illustrations illustrating an embodiment of an application flow for creating a voice based scene.

DETAILED DESCRIPTION

Figure 1:
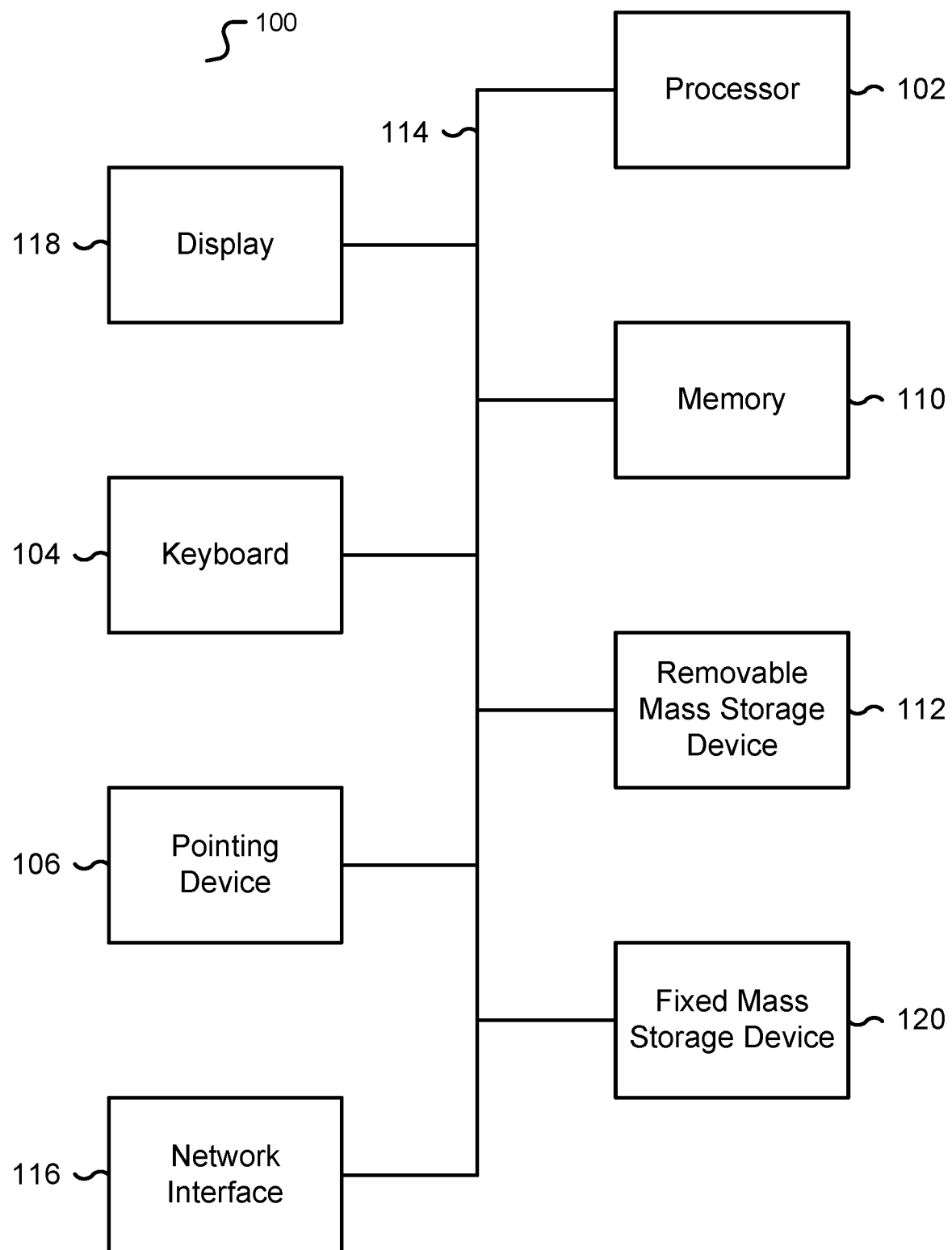
FIG. 1 is a functional diagram illustrating a programmed computer/server system for control of complex input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Programming a playable scene by natural language is disclosed. In various embodiments, a scene playable by a system or application configured to control one or more controlled systems in a physical environment, such as a smart home system or application is programmed via natural language. In some embodiments, compound verbal commands describing the desired scene are received, parsed, and mapped to control commands to be executed to provide a scene. In some embodiments, a scene is defined and stored as a macro, for example, a set of executable instructions. The macro may be invoked via a natural language or other interface, for example, by uttering a keyword, trigger words, or other command associated with invoking execution of the macro.

Control systems in the home or office often allow for scenes where, for example, a "good morning" scene can open shades, turn on lights, and play music. Traditionally, to create and/or program a scene requires substantive programming. More recently this has been improved with mobile or tablet applications that create scenes using a GUI. Creating scenes by natural language, for example by voice programming, is disclosed.

For example, a scene is created that runs the text "turn on the lights open the shades and play the Beatles" and by pressing a "good morning" button or saying "good morning." Compound command techniques such as those disclosed in U.S. Provisional Patent Application No. 62/367,999 entitled SPEECH CONTROL FOR COMPLEX COMMANDS filed Jul. 28, 2016 and U.S. patent application Ser. No. 15/449,825 entitled SPEECH CONTROL FOR COMPLEX COMMANDS filed Mar. 3, 2017, which is incorporated herein by reference for all purposes, may be used at least in part to process such text. A set of commands is built from the interpretation of the compound command. The set of commands may include programming constructs such as conditionals, loops, error checking, and testing. The set of commands may be executed when triggered by an event, time, or other trigger condition. In one embodiment, a natural language command parser is used to interpret commands and based on special grammatical constructs applies coding constructs around the interpreted commands.

Another more complex example is an example scene that sets devices, runs color lights through a rainbow animation, and then resets the room at the end. Typically scenes do just set the room with a group of devices, but this essentially runs a program sequence. The voice programming for the example scene is:

"Play Cloud Atlas in the conference room, close the shades, set the rainbow lights to 100%, turn off the conference room ceiling lights and turn off the entrance lights, wait 1 second, set the conference room lights to red, wait 3 seconds, set the conference room lights to orange, wait 3 seconds, set the conference room lights to yellow, wait 3 seconds, set the conference room lights to green, wait 3 seconds, set the conference room lights to blue, wait 3 seconds, set the conference room lights to indigo, wait 3 seconds, set the conference room lights to violet, wait 3 seconds, set the conference room lights to cool white, wait 2 seconds, open the shades, turn on the conference room lights, turn on the entrance lights, set the music volume in the conference room to 15%, wait 2 seconds, set the music volume in the conference room to 10%, wait 2 seconds, set the music volume in the conference room to 5%, wait 2 seconds, stop the music in the conference room."

FIG. 1 is a functional diagram illustrating a programmed computer/server system for control of complex input in accordance with some embodiments. As shown, FIG. 1 provides a functional diagram of a general purpose computer system programmed to provide complex input processing in accordance with some embodiments. As will be apparent, other computer system architectures and configurations can be used for complex input processing.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
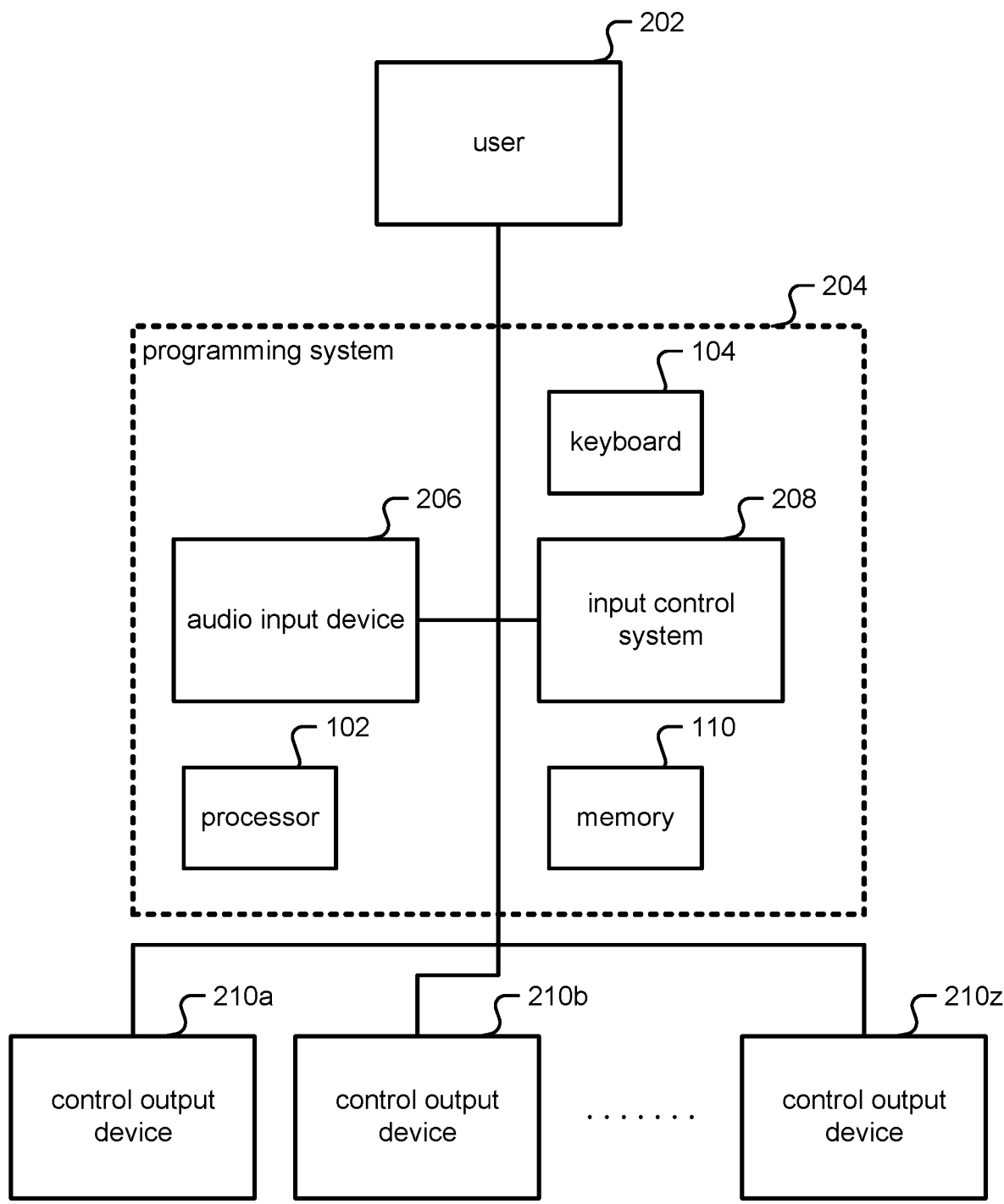
FIG. 2 is a block diagram illustrating an embodiment of a system for complex input processing.

FIG. 2 is a block diagram illustrating an embodiment of a system for complex input processing. User (202) is coupled to programming system (204), either through an audio input device (206) if by way of speech, or directly to the input control system (208) if by way of written word, for example by typing or texting. In one embodiment, programming system (204) is a computer system as shown in FIG. 1 and includes processor (102) and memory (110). In one embodiment, the programming system (204) is a mobile phone, computer, or dedicated smart home device. In one embodiment, a physical, phone, touchscreen, swipe-based keyboard and/or virtual keyboard (104) is included for typing or texting. The audio input device (206) may be coupled and/or part of the input control system (208) as well. After interpreting programming, the input control system (208) may be coupled to one or more control output devices (210), here shown with three devices (210a), (210b), and (210z). The control output devices (210) may be a single smart home hub and/or may include additional smart home devices for direct control.

Figure 3A:
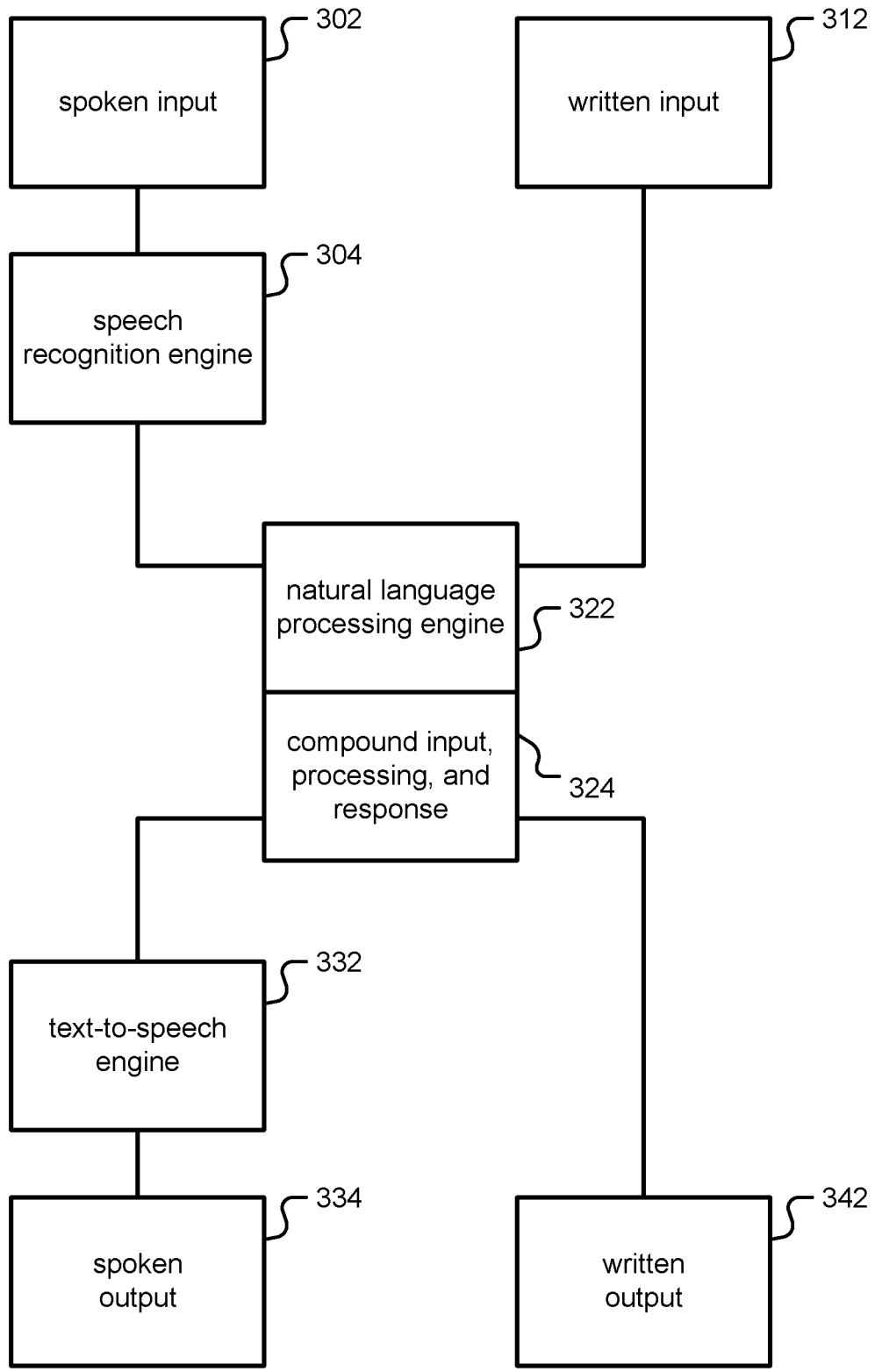
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3 is at least part of the programming system (204) in FIG. 2.

As FIG. 3A illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, delete, the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

Figure 3B:
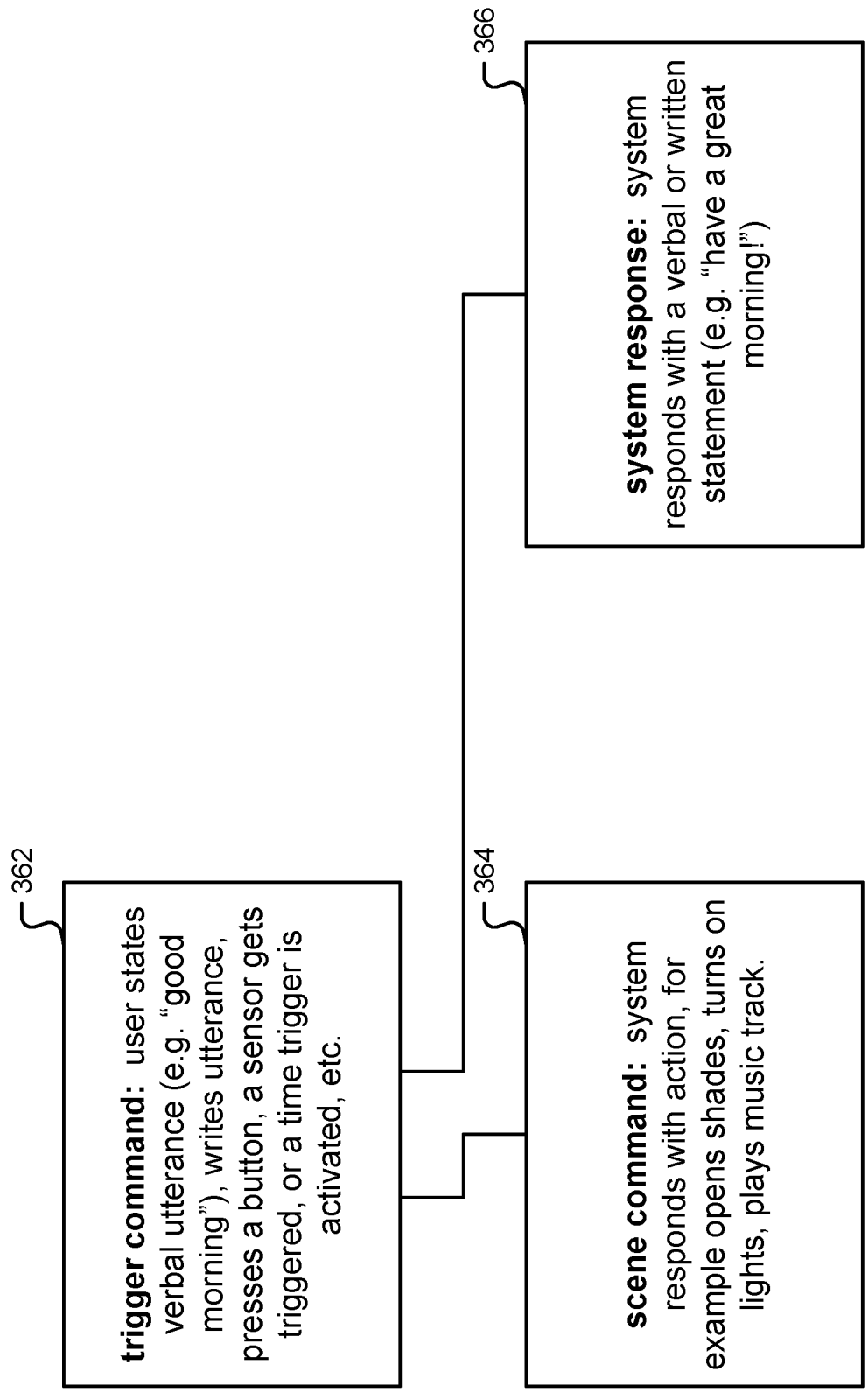
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2.

Trigger command (362) is an action that triggers a scene. In the example of FIG. 3B, the action includes: a voice command, for example a user that says "Good morning"; a button press, for example a user that presses a button titled "Morning"; a triggered sensor; and/or a triggered time, for example based on a schedule.

After the system is triggered (362), the system may optionally respond with a scene command (364). Examples given in FIG. 3B include opening the shades, turning on the lights, and playing a musical track.

An important distinction of conditional programming as described herein is that conditionals may be used within the trigger (362) and may be used within the scene command (364).

A first example of a conditional trigger is to set a trigger (362) based on a schedule every 8am to trigger a scene "good morning" which includes opening the shades.

A second example of a conditional scene command (364) is the command "if it's after 8am then open the shades." Appropriate context would be a user to give a trigger command based on an utterance like "get the house ready" where the system would open the shades, if that utterance comes in after 8 am. This scene would not run after 8 am, as the scene command (364) is conditionalized on that after being triggered (362).

With two potential areas for conditionals, this may make less sense is if the scene were triggered via schedule (362) to run every day at 7 am. In this case, the scene command (364) conditionalized on the time being after 8am is redundant. In many examples below, time is conditionalized within scene commands (364), which is different than a time based trigger. Without limitation, the below examples may also use time based triggers instead of or in addition to the scene command conditionals.

After the system is triggered (362) a system response (366) may optionally be issued by responding with a written or verbal output, for example "Have a great morning!"

Figure 4C:
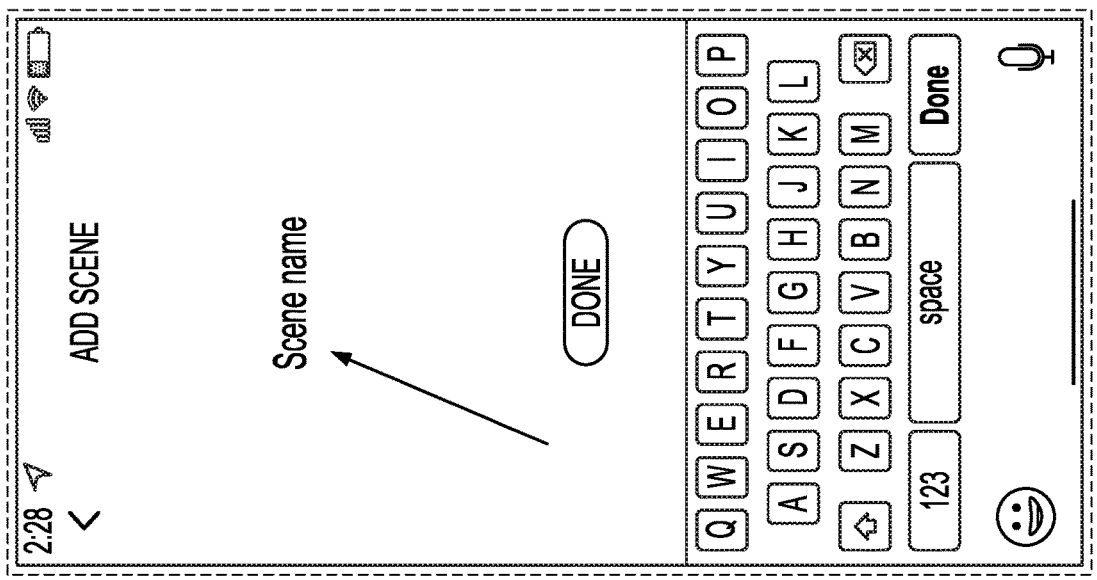
Figure 4B:
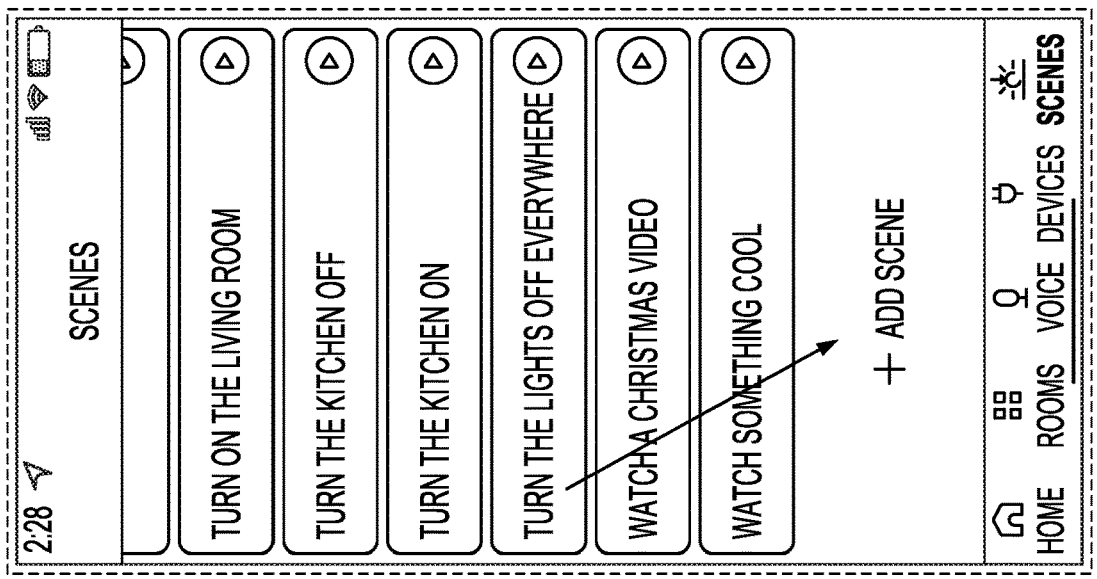
Figure 4A:
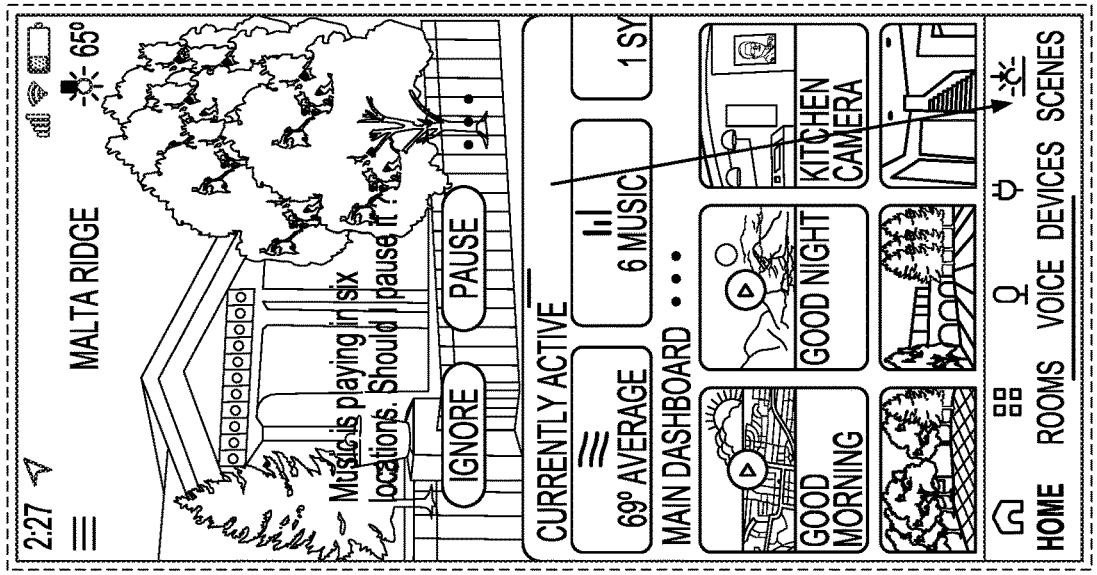

FIGS. 4A-4J are a series of illustrations illustrating an embodiment of an application flow for creating a voice based scene. In FIG. 4A, on an opening page of an app such as an Android app or iOS app a button titled "SCENES" is pushed to manage scenes.

In FIG. 4B, after pushing the SCENES button in FIG. 4A, a list of scenes already created is given to play and a button to "ADD SCENE" is pushed to add a scene. In FIG. 4C, after pushing the "ADD SCENE" button in FIG. 4B, a "Scene Name" is prompted for, with voice and/or virtual keyboard options to enter the scene name.

Figures 4D, 4E, 4F:
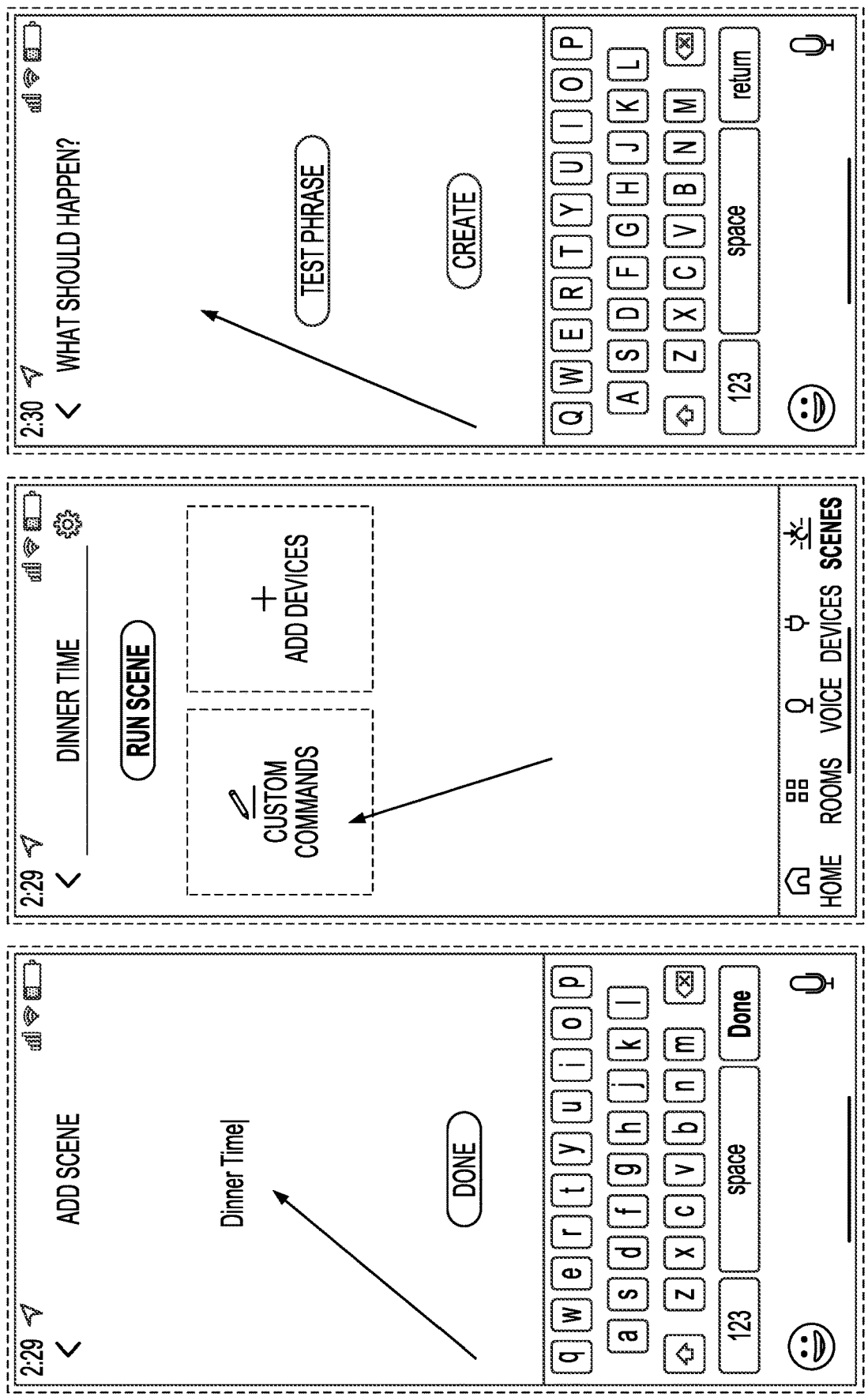

In FIG. 4D, after naming the scene of FIG. 4C, in this example as "Dinner time", a "DONE" button may be pushed to complete the name. In FIG. 4E, after the "DONE" button is pushed in FIG. 4D, the "DINNER TIME" scene is defined using custom commands, by selecting devices, or by adding devices. To define by custom commands a "CUSTOM COMMANDS" button may be pushed. In FIG. 4F, after the "CUSTOM COMMANDS" button is pushed, the "WHAT SHOULD HAPPEN?" prompt permits a user to enter one or more commands for scene creation with voice and/or virtual keyboard options to enter the scene commands.

In FIG. 4G, after a user enters a set of commands in FIG. 4F, in this example "Close all the shades, dim the dining room lights to 25%, and play Frank Sinatra", the commands are displayed. In FIG. 4H, a user may push a "TEST PHRASE" button after the state of FIG. 4G, to test the "Close all the shades, dim the dining room lights to 25%, and play Frank Sinatra" phrase. In FIG. 4I, after the user pushes the "TEST PHRASE" button of FIG. 4H, a response may be returned from the system. In this case, a notification is brought forward with the system response from the three commands in the phrase "Close all the shades, dim the dining room lights to 25%, and play Frank Sinatra", which is "Closing the shades. The brightness is now 25%. Now playing Frank Sinatra."

Figure 4J:
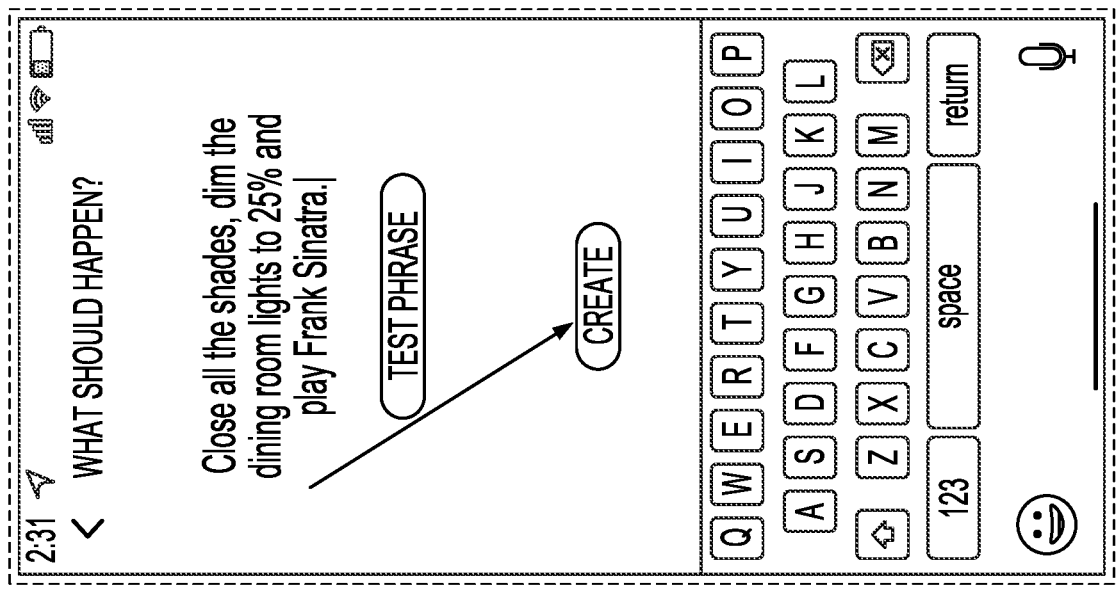

In FIG. 4J, alternately or in addition to pushing the "TEST PHRASE" button of FIG. 4H, the user may push the "CREATE" button to create the scene and add it to the library of scenes shown in FIG. 4B.

Figure 5:
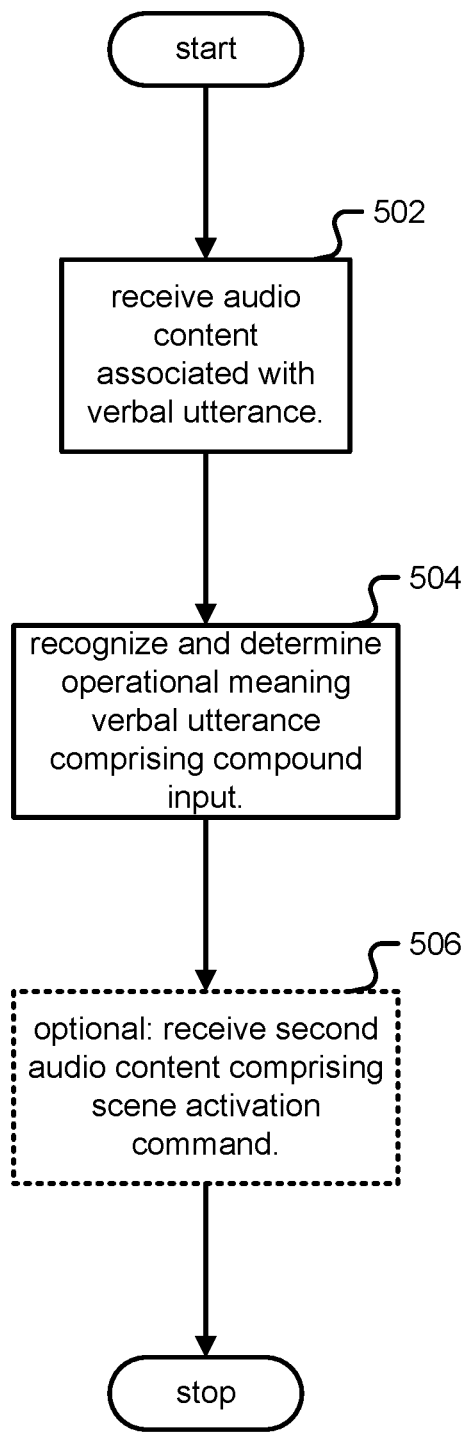
FIG. 5 is a flow chart illustrating an embodiment of a process for natural language programming.

FIG. 5 is a flow chart illustrating an embodiment of a process for natural language programming. In one embodiment, the process of FIG. 5 is carried out by device (204) in FIG. 2.

In step 502, audio content associated with a verbal utterance is received. In step 504, an operational meaning of the received verbal utterance comprising a compound input is recognized and determined. In an optional step 506, a second audio content comprising a scene activation command is received.

Figure 6:
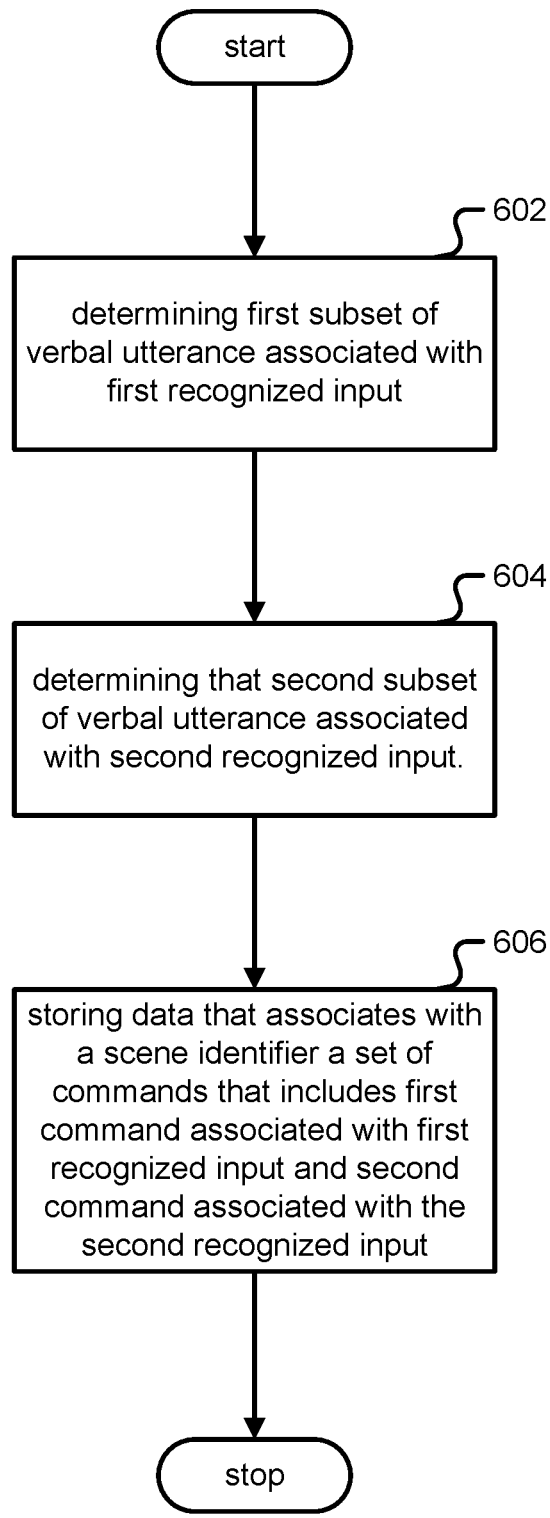
FIG. 6 is a flow chart illustrating an embodiment of a process for recognizing and determining operational meaning.

FIG. 6 is a flow chart illustrating an embodiment of a process for recognizing and determining operational meaning. In one embodiment, the process of FIG. 6 is carried out by device (204) in FIG. 2 and is part of step 504 in FIG. 5.

In step 602, it is determined that a first subset of the received verbal utterance is associated with a first recognized input. In step 604, it is determined that a second subset of the received verbal utterance is associated with a second recognized input. In step 606, data is stored that associates with a scene identifier a set of commands that includes a first command associated with the first recognized input and a second command associated with the second recognized input.

In one embodiment, the scene activation command is mapped to the scene identifier. In one embodiment, the set of commands is executed based at least in part on receiving the second audio content and further configured to map the scene activation command to the scene identifier. In one embodiment, the set of commands associated with the scene identifier is executed at a prescribed time or schedule. In one embodiment, the first command controls a first controlled system and the second command controls a second controlled system.

In one embodiment, the first controlled system and the second controlled system each control a physical environment. In one embodiment, the physical environment includes at least one of the following: a home environment, an office environment, a commercial environment, and a retail environment. In one embodiment, the physical environment includes at least one of the following: an indoor environment and an outdoor environment.

In one embodiment, the physical environment includes at least one of the following controllable devices: light, shade, blind, audio, music, music playlist selection, music artist selection, music song selection, music album selection, video, video channel, video volume, thermostat, temperature, humidity, lock, garage door, door, gate, fountain, pool, coffee maker, fireplace, fan, relay, and shower.

In one embodiment, the received verbal utterance further includes a control parameter. In one embodiment, the control parameter is a limitation, wherein the limitation is a temporal or spatial limitation. In one embodiment, the control parameter is a sequence, wherein the sequence is a temporal or spatial sequence. In one embodiment, a parameter is determined from the received verbal utterance, wherein the parameter is a temporal or spatial parameter.

In one embodiment, in the set of commands an internal representation of logic is included to implement the sequence. In one embodiment, the internal representation of logic includes stopping execution of a first command on a first system and beginning execution of a second command on a second system based at least in part on a punctuation mark associated with the first subset and the second subset. In one embodiment, the internal representation of logic includes stopping execution of a first command on a first system and beginning execution of a second command on the first system based at least in part on a punctuation mark associated with the first subset and the second subset. In one embodiment, the internal representation of logic includes a transition, wherein the transition is trigger-based or event-based, and wherein the transition is based other than or in addition to time.

Multiple References for Objects. Traditionally, smart home systems such as Google Home, Amazon Echo, Apple HomePod, and Samsung SmartThings use a unique reference for "objects", wherein objects as referred to herein include devices, rooms, scenes, and timers. The ability to have multiple names for activating or accessing an object is disclosed.

In traditional smart home systems the various objects have a single, unique name. There may be a room called "The Living Room", or a scene called "Good morning". This provides a level of consistency to traditional systems because when presented information about the living room on a screen, traditional systems require it to have a specific title. For example, a labeled button on a screen that activates a scene is required to have a consistent name like "Good morning" no matter where that button is shown.

An improvement is to overcome this limitation, especially when using natural language, because: 1) Different people may call the same object by different names. The den room may be referred to as "the den", "dad's office", "my office" or "man cave" for example; and 2) A scene called "Good morning" may need to be activated when the user says "I'm wake", "Start the day", "We're up", or "We're awake now." As referred to herein, natural language is used to indicate text that is derived from something a user might say and/or type.

Three techniques to address such alternative names include:
1. The system maintains global equivalencies for example that "gym", "gymnasium", "exercise room" and "workout room" all refer to the same object. Thus, if a user names a room with any one of these names the system responds to any other related names, unless there is a room that explicitly uses one of these alternatives. These global equivalences are stored in the application and may be updated from time to time. Additions to the tables may even be made available thru access to data stored in the cloud;
2. The system may also allow the user to enter multiple local equivalences, or alternative names for any object; and
3. The user may have many similar alternative names for an object—for example for "patio" they may have "the beautiful patio", "the outside patio", "the outdoor patio", and "the back patio." It is therefore convenient to have some form of description, referred to herein as a name expression, that allows multiple alternatives to be represented more compactly. Thus a name expression is an expression that describes a set of names in a compact/efficient form. Backus-Naur Form (BNF) is one such representation, and others may be used such as regular expressions. Using BNF the prior example may be compressed to "the (beautiful outside outdoor back) patio". This representation may be optional and a user may wish to instead explicitly list all such names.

Example steps supported for adding multiple references include:

1. Selecting the object to edit, or selecting to create a new object;
2. In the event creation of a new object was selected, entering the base name for that object. For existing objects, editing the existing name is supported;
3. For adding additional names, asserting a plus-sign "+" or similar icon to add a new blank name and filling it in. The syntax of the BNF in the name is validated before saving;
4. Existing additional names may be removed by indicating a negative-sign "−", trash can, or similar icon to facilitate the removal; and/or
5. Existing names may be edited by clicking on a name field and editing it in the usual way. The update may be automatic as the user types or there may be some sort of icon that indicates that the name should be saved.

Voice Scene Trigger. Triggering a scene either using its name or some key phrase containing its name is disclosed. In a voice based system the scene is triggered by speaking one of a multiplicity of names defined by the name expression associated with a scene, optionally with extra verbiage. For example a user may trigger the good morning scene by saying "Good morning" or "run the good morning scene".

A default set of extra verbiage is typically provided by the system. If a user wants additional or special verbiage they may do so by simply augmenting the sets of names or name expressions they provide.

Example steps supported for voice scene triggers include:

1. The system has a set of predefined phrases that may be used to activate a scene such as "run <scenename>" or "activate the scene name <scenename>" or even just "<scenename>";
2. When a verbal input is received it is tested to see if it matches any of the phrases for each possible scene name;
3. If a match is found, that scene is executed and the system returns to listening; and/or
4. Otherwise the system tries to match the input to the many other non-scene things it knows about, handles them appropriately and goes back to listening.

Multiple Custom Scene Responses. Having multiple custom responses for a scene is disclosed. When a user activates a scene in a system without voice the only feedback is often that the devices associated with the scene are triggered. Some systems may indicate that that scene is active with a light or perhaps an indicator on a display.

For a voice activated scene in most cases some kind of verbal response is desirable. This may be a single fixed phrase which may include the scene's name. It is preferable to have a multiplicity of possible responses. The system may then select one of those responses to give when the scene is activated.

Example steps supported for multiple custom scene responses include:

1. When a scene is created or edited a list of verbal responses are provided;
2. Add additional responses by asserting a plus-sign "+" or similar icon to add a new blank response and fill it in;
3. Existing additional responses may be removed by asserting a negative-sign "−", trash can, or similar icon to facilitate the removal; and/or
4. Existing responses may be edited by clicking on a response field and editing it in the typical way. The update may be automatic as the user types or there may be some sort of icon that indicates that the response should be saved.

Response Selection. The system may select which response to use based on a variety of criteria. For example, the response may be selected:

1. Randomly or by going sequentially through the list of responses and either looping back to the start or applying some other algorithm to select the next response. This is the default overall strategy for response selection, but other strategies listed below may be added, edited, or removed from the overall strategy. This strategy may be a property of the scene and so may be set using a pop up or similar UI element if such a strategy is desired;
2. From the subset of responses that apply to the person activating the scene, which may be determined in many ways including but not limited to "speaker recognition" or associating the device activating the scene with a person. For example, if it comes from Alex's iPhone the system assumes Alex is the user activating the scene. This is referred to herein as user context;
3. From the subset of responses that apply to the location of the person activating the scene, which may be determined in many ways including but not limited to geopositional location or associated the device activating the scene with a location. For example, if it comes from the hallway thermostat, the system assumes the user is in the hallway. This is referred to herein as location context;
4. From the subset of responses that apply to the device type it was activated with, such as an app, a web browser, a stand along microphone, and so on. This is referred to herein as device context; and/or
5. Based on the time of day, weather or the status of any device the system has the ability to access. This is referred to herein as environment context.

The above strategies may be combined as needed. These may be a property of particular responses and so may be provided by having a condition expression that describes when each response applies. As described herein, a condition expression is an expression that defines when a response is to be used. This may be done by having a separate field that describes the condition under which the response may be used or it can be prefixed or suffixed onto the response.

Such an expression may have a very "computer language"-like syntax such as:

firstname=="John" && hour( )>12 && hour( )<6 though for many cases a more user friendly form of the condition can be used such as:

John, afternoon which is a condition expression that is true if the user is John and it is in the afternoon.

Using a method of prefixing the response with the condition expression, a user may provide different responses such as:

John, morning::Good morning John, how's your day starting?

John, morning::Good day John, how's (the|this fine) day starting?

John, afternoon::Good afternoon. How's your day going
so far, John?
John::Hey! What's up, John?
What's cooking?
In this example, the system selects the response that is the most specific but falls back as needed. So
  if the user context is not John a response is "What's cooking?";
  if the user context is John but it is not the morning or afternoon a response is "Hey ! What's up, John?";
  if the user context is John in the afternoon a response is "Good afternoon. How's your day going so far, John?"; and
  and if the user context is John in the morning one of the three matching possible responses is:
    "Good morning John, how's your day starting?"
    "Good day John, how's the day starting?"
    "Good day John, how's this fine day starting?"
Example steps supported for response selection include:
  1. The system has matched a scene that has one or more responses;
  2. The process that executes the scene is initiated;
  3. Each response is analyzed to determine whether the condition expression is true;
  4. In each successful case, the number of conditions in the condition expression is monitored;
  5. The maximum number of conditions that matches is determined, and matches containing fewer matched conditions are discarded;
  6. For the remaining responses a response is picked using the overall strategy, or the system standard for that strategy if the strategy is not user editable; and/or
  7. The selected response is output to the user.

Custom Compact Responses. Generating custom responses represented by a response expression that is more compact than listing all possibilities is disclosed. It is desirable to have many possible responses to a user input as it makes a mechanical system feel less robotic and more anthropomorphic, increasing comfort for the user.

In order to easily increase the variety of the responses it is desirable to allow an optional response expression which as referred to herein is analogous to the name expression discussed earlier. Thus, a response expression is a set of responses in a compact/efficient form. A BNF representation may be used though other representations such as regular expressions are possible.

Rather than having three separate responses to a "good morning" scene like "Have a nice day", "Have a good day" and "Have a great day" this may be compressed into a response expression "Have a (nice|good|great) day". It may also be made yet more general with "Have a [very|extremely] (nice|good|great) day [, my friend]".

An example system step supported for custom compact responses includes augmenting the algorithm for having multiple responses to validate the BNF of any saved response.

Dynamic Responses. Custom responses containing dynamic information, referred to herein as information that is not fixed and/or static. Having a response provide more time based information such as the current date and time, a weather forecast, a news summary, or the result of a calculation is disclosed. This may be done by associating the desired extra info as a property of the scene, but may be more flexible if the response contains an inline indicator of what information to provide.

Different computer languages have differing way of representing embedding as such. ColdFusion delimits using hash # characters. JavaScript delimits in $ {and}. The particular form used is without limitation. For example, a "good morning" scene may have a response:

"It's #time ( )#. #weatherforecast( )#Have [an incredibly |a very |a](good|great|wonderful|nice) #dayofweek ( )#."

Which may produce output:

"It's 7:34 AM. Today's forecast is light rain with a high of 74 degrees. Have an incredibly great Wednesday."

A second example is response:

"Good (morning|day) to you too. Here's the latest news: #news ("NPR") #"

Which may produce output

"Good morning to you too. Here's the latest news:", and then stream a news summary provided by NPR.org.

Example steps supported for dynamic responses include:
  1. When a response is selected for output, the response is parsed to determine if it uses one of the characters that make it a response expression rather than just a simple response;
  2. Simple responses are simply output;
  3. For a response expression that is in BNF, brackets "[" and corresponding "]" are sought;
  4. Based at least in part on a pseudo-random number variate, either the entire substring is deleted including the brackets, or the brackets are converted into the corresponding kind of parenthesis "(" and ")";
  5. Steps 3 and 4 are repeated until all brackets are resolved;
  7. An open parenthesis "(" and its corresponding close parenthesis ")" are sought.
  8. Within the parenthesis is a list of alternatives separated by vertical pipe "|". There may be nested parenthesis with their own vertical pipe (s) "|" which are not counted as separators at this step;
  9. The entire parenthesized substring is replaced with a randomly selected alternative from the list;
  10. Steps 7 thru 9 are repeated until no parenthesis are left;
  11. Dynamic information is injected based on the dynamic information delimiters; and/or
  12. The final response is output.

Natural Language Scene Construction. A scene constructed or partially constructed out of natural language is disclosed. Traditional scene construction systems allow a user to select devices and set their states such as which lights are on, how bright they are, and/or what color they have. They may allow shade/blinds control, temperatures, and other devices and may cue up particular music or video. This is most commonly done be interacting with a system thru a screen based device such as a computer or tablet and checking boxes or entering values. Using such a GUI approach requires the GUI architect/designer to statically allocate and/or account for any permutations and combinations of objects/actions required for scene construction and have visual icons/other representations. If a new device is brought to market, the system thus requires a visual update to architect how the GUI can accept scene construction for the new device.

In a voice based system, much of this may be done more simply by accepting verbal commands a user would use to perform those actions. Improving over a user having to click dozens of buttons, natural language scene construction allows the user to save learning time, execution time, and complexity by inputting something like: "Turn the outside and first floor lights to 50%, open the drapes on the first floor and turn off the master bedroom lights. Then play Bach throughout the house."

This text can be entered into the scene either by typing natural language into a text box or by speaking the command and saving the transcription into natural language. The disclosed may not preclude the user from using the traditional GUI interface to define the scene, but rather augments a GUI based scene approach.

Example steps supported for natural language scene construction editing include:
1. The scene editor is augmented by a blank text box and a Save button. Auto save may also be used;
2. The user clicks in that text box;
3. The user is prompted to either type natural language commands into the text box or use a system for entering spoken words into the text box, for example by pushing a button with a microphone icon on it then speaking; and/or
4. If auto save is not implemented, the user may click Save to save the text along with the scene.

Example steps supported for natural language scene construction execution include:
1. When the scene is executed the system executes any part of the scene that was set up by the GUI in the usual way;
2. If there is natural language text associated with the scene, the system takes each line of text and passes it to the normal process it uses for language interpretation. This has the effect of automatically putting punctuation at the end of a line. What punctuation is added depends on the input. For example, for "open the shades" it may be a period and for "what time is it" it may be a question mark;
3. Any output from interpretation of the natural language speech can be ignored; and/or
4. Steps 2 and 3 are repeated until all lines of the natural language have been executed.

Note that whether steps 1 and 2 are executed in series or parallel is implementation dependent without limitation. However, all individual natural language lines in steps 2 and 3 should be executed in series to avoid ambiguity in the meanings of words like "them" which may refer to a set of objects defined in a prior line of language.

Testing and Error Checking Scenes. When a scene is being constructed it is an improvement to have a "test" and/or "run" button that applies the scene beforehand to make sure it is doing the correct actions. When scenes are created via a GUI just having a button is often sufficient as the static GUI architect/designer tends to incorporate all possibilities and permutations within the interface. However, when natural language text is used to create the scene, it is important that the results of "running" that text be shown to the user for debugging purposes.

One example of error checking is checking for infinite loops or infinite recursion. For example, if a user defines the "Good Morning" scene with a scene statement that calls the "Good Morning" scene itself. Without error checking, the system may be wore down, damaged or destroyed, for example because of over triggering of solenoids or relays associated with the smart home devices.

For example if the text were "set the lights in the guest closet to 50%", a response with no error might be "Lights now 50%" but other possible responses might be "There is no guest closet in this house" or "There are no lights in the guest closet" or "The lights in the guest closet can only be set to on or off."

One component for testing scenes created by natural language is to provide feedback as to what the system did. This may be simple like a dialog box that provides the same results the system would have given if that utterance were spoken to it. It may be augmented with output that highlights errors or even output that shows only the errors. Based on the output, the user may edit the text associated with the scene, or change GUI elements and retest until the scene performs as desired.

Example steps supported for testing natural language scene construction include:
1. Either a test button in the scene creator and editor is used to assert a test, or a spoken command to the system can be issued to run a test;
2. Pressing the Test button proceeds as described in the previous section for steps for executing a natural language scene except that at step 3, the natural language responses may be accumulated as text;
3. Additionally the system highlights text in the output which corresponds to an error condition. The form of the highlighting depends on the capabilities of the display but the use of color such as light red may help make the errors more distinguishable from the regular output; and/or
4. When the scene has finished execution, the results may be displayed in a dialog for the user, or spoken back if a voice only system. It may be possible to display the text in the dialog as the execution of the scene progresses. Where the text is displayed as the scene is executed a cancel button can be provided to stop the scene from continuing to execute.

Context Based Scene Names. Multiple scenes with the same name that are selected based on who activates it, where it is activated, the time or day or any other conceivable condition is disclosed. In traditional systems, the name of a scene is usually unique. For example, a user only has one "good morning" scene. At best, as scenes are typically attached to buttons, a user may have multiple buttons labeled "Good morning" but what the scene does varies based on which particular good morning button was pressed.

In a similar way that conditions and/or context determine which response to give based on a variety of conditions and/or context including user context, location context, device context, and/or environmental context, for multiple scenes with the same name or name expressions may also be "overloaded" such that the choice of the particular scene to activate depends on those conditions. This may be done either by having a condition expression attached to the name of the scene or by having the condition expression as a separate editable field.

Example steps supported for editing context based scene names include:
1. A field added to the scene editor describes a condition expression under which a scene name may be matched; and/or
2. When the user attempts to save a scene, the validity of that expression is checked before allowing the save to proceed.

An example system step for supporting matching context based on scene names includes augmenting matching as described above to evaluate the condition expression before attempting to match the names of any scenes.

Noticing and Suggestions. In one embodiment, the system notices combinations to suggest or create a scene and/or scene trigger automatically or semi-automatically. For example, the system may notice one or more commands run based on inferred triggers or events. The system may then prompt " . . . and do you always want to run that when you wake up?" wherein it associated motion with waking up and a suggested scene trigger. It may also notice that the user closes the front blinds whenever the living room temperature is above 70 F and prompt "I have noticed you close the front blinds whenever it is warm, would you like me to create an associated scene and scene trigger? . . . What would you like to call the scene?"

Natural Language Programming. Adding programmability to a scene is an example of natural language programming. Traditionally scenes rarely have sophisticated programming components associated with them, and when they do it is in the form of a traditional computer language.

A scene with a natural language component enables use of the text area to either support coding in some particular language or to have a mix of computer language and natural language. One example of such a mixture would be:

if (hour ( )>12) {
   Close the shades on the first floor.
   Play Bach in the living room and turn on the living room lights
   wait for 3 seconds and then watch house of cards season 1 episode 3 in the den.
}
else {
   shut off all the lights in the house and close the shades.
   and while you're at it turn off all the tvs.
}

As shown above, this uses natural language phrasing between computer language like control elements. In the past systems, such as AppleScript, have claimed to be "like" natural language but fall short of supporting the kinds of phrasing humans use. Extending scene programmability to allow instead a mixture of computer language and natural language permits versatility as computer languages provide more precision and formality than natural language may provide.

Example steps supported for editing natural language programming include:

1. The text input and saved such as "Turn the outside and first floor lights to 50%, open the drapes on the first floor and also turn off the master bed room lights. Then play Bach throughout the house" may not be validated in any way before saving; and/or
2. The syntax of the natural language text is systematically tested:
   a. Each line is scanned to determine whether it is natural language or a programming language construct. In one embodiment, this is done by looking at the characters at the start of the line;
   b. Lines of programming are further evaluated to insure syntactic correctness, and the entire program structure is evaluated to make sure it is properly formed.

In one embodiment, explicit (when typed) or inferred (when verbally dictated) punctuation marks such as a period, except when beside a number, a question mark, an exclamation mark, and a new line character, and sometimes a comma, are used to separate natural language programming commands.

Example steps supported for executing natural language programming include:

1. The natural language text is converted into a proper program. In one embodiment, lines that correspond to programming constructs are simply output, and lines of natural language text are converted into function calls passing the text of that line as a parameter. The exact mechanism depends on the nature of the underlying programming language being used; and/or
2. The resulting progress may be executed as normal and it will have the same effect as discussed above in the section on Natural Language Scene Construction, where no programming language constructs are present.

Extended Natural Language Interpretation. Extending the kinds of natural language inputs the system accepts to include programming concepts such as conditional statements increases the versatility of the system. This includes enabling an ability to add programmability to a scene by extended natural language interpretation, for example a user may state:

when it's after 2 PM
   Close the shades on the first floor.
   Play Bach in the living room and turn on the living room lights
   wait for 3 seconds and then watch CNN in the den.
otherwise
   shut off all the lights in the house and close the shades.
   and while you're at it turn off all the tvs.

A second example could be written as:
   if after 2 pm, close the shades on the first floor, play Bach in the living room and turn on the living room lights then wait for 3 seconds and watch CNN in the den.
   otherwise shut off all the lights in the house, close the shades and while you're at it turn off all the tvs.

Another example is the statement "at 7:05 pm, close the shades". A trigger may be based on a conditional, such as "when the garage door opens after 5 pm on a weekday, turn on the kitchen lights". The trigger may be based on time, weather, states of other devices, who is home, or other contextual information such as user context, device context, location context, and/or environmental context. For example, the conditional construct may be based on the statement "if the house is empty, close the shades", which may also be supplemented by "if the house is not empty, open the shades".

Conditionals may be part of scene statements or part of scene triggers. For example for the "Good Morning" scene, two conditional scene statements may be "if it's sunny outside, open the blinds all the way" and "if it's cloudy outside, open the blinds halfway." Another conditional statement as part of a scene trigger may be "run the Good Morning scene if it's Friday morning at 7 am."

Another extended programmable construct is a loop construct within a natural language structure as well. For example, if a user wants to slowly reduce the volume of music they may say:

reduce the music volume in the living room by 20%, wait for 2 seconds and continue until the volume is below 2%. Then shut off the music.
   turn on the chandeliers wait for 4 seconds then turn them off. Do that every minute until 3 PM
   turn on the patio fans do a 10 second delay then turn them off and wait for 15 seconds. repeat 7 times In one embodiment, a key part of the implementation is the representation of an expression and its use in a condition. In a computer language an analogy to reduce the volume of a device d by 20% between noon and 4 PM may be as follows:

if (Hour(Now( )>6 && Hour(Now( )<10) d.volume*=0.8;

Whereas a human would use natural language to say:
   if it's after 6 AM and before LOAM, reduce the volume by 20%.

One objective is to define a human conditional expression sufficient for most purposes required for conditional execution of attendant natural language commands or that can be used for loop termination conditions. As defined herein, a human conditional expression is a conditional expression in natural language that may be analyzed to obtain a truth value for use in human-based programming and/or natural language programming.

In particular terms are defined such that they may be joined using separator phrases as referred to herein as phrases that separate like "and", "or", "unless", "assuming that", and "except", or the use of a comma or an implied comma. Such an expression may be assumed to be in disjunctive normal form. Other separator phrases include "assuming", "assuming that", "provided", "provided that", "whenever" and many more. A good implementation may handle many separator phrases and have a method for easily adding more.

Terms may deal with a plurality of context, for example date, times, weather conditions and forecasts, who is speaking, and/or the state of devices in the system. A few simple examples of such terms expressed in BNF are:

(It is|the time is) [not]<time>[and (after|before) <time>]
(It is|the time is) [not] (after|before)<time>[(and|but) (after|before)<time>]
(It is|the time is) [not] between <time> and <time>
it is [not] (morning|afternoon|evening|night)
it is [not] [a]<dayofweek>
it is [not]<month>
(it is|(you are|i am) [not] (talking|speaking) (to|with)) <person>
<person> is [not] (talking|speaking) [(to|with) (you|me)]
(it|the weather) is [not]<weathercondition>
it will [not]<weathercondition> (today|tomorrow|soon-|before <time>|after <time>)
today's (high|low) (is|will|be)<temperature>
[the]<device> is [not] [below|above|brighter than|greater than|dimmer than|less than)<devicestate>

Practical terms may be made more complex. Also since a user may invent a novel term, a mechanism is in place to automatically detect the use of unrecognized terms and save those in a central repository so the system may expand its coverage. This process may require user approval even when the system makes a good guess or high confidence level as to the purpose of the term.

Even with the above simple example terms, fairly complex expressions may be written. One example expressed in the form of a conditional such as a pre-fix conditional:

if it is after midnight and John issues a command in the bedroom, and the front door is unlocked, lock the door.

It is also important to handle post-fix conditionals;

Lock the door if it is after 10 pm, John issues a command in the bedroom, and the front door is unlocked.

and split conditionals:

if it is after 10 pm, and John issues a command in the bedroom, and the front door is unlocked, lock the door, unless it's Tuesday
if it is after 10 pm, and John issues a command in the bedroom, and the front door is unlocked, lock the door, assuming that it's Tuesday
if it is after 10 pm, and John issues a command in the bedroom, and the front door is unlocked, lock the door except on Tuesday if the front porch lights area still on.

Note that the syntactic form for terms following except is different than the syntactic form of terms following unless. Each term may have alternative forms when they follow certain separator phrases.

In the above examples if represents a conditional. But other if phrases, as referred to herein as phrases that invoke an if-like objective such as "when", "whenever", "if ever", and others, may be used instead. A simple mechanism is used to add to the list of if phrases.

Another key feature is an ability to have an alternative thing to do when a condition fails. In a typical computer language the word else is often used for this but rarely is used in a natural language environment. In English, other else phrases as referred to herein as phrases that evoke an else-like objective like "otherwise", "if that's not true then" and others. A simple mechanism is used to add to the list of else phrases. Like if phrases, else phrases may be used in a pre-fix, post-fix, and/or split position.

For example, one phrase that may be processed includes:
If it's sunny and less than 75 degrees outside, open the shades
otherwise turn on the lights.

Another key feature is the ability to allow for a loop—repeatedly performing some series of steps until some condition is met. Iteration may be for a specific number of times or unless some condition is met or not met. Some examples iteration include:
turn the kitchen lights down by 10% and turn the bathroom lights up by 15%. Do that every 15 seconds for the next minute.
turn the kitchen lights down by 10% and turn the bathroom lights up by 15%.
every 15 seconds turn the kitchen lights down by 10% and turn the bathroom lights up by 15% until a minute has passed
every 15 seconds turn the kitchen lights down by 10% and turn the bathroom lights up by 15% and repeat that 7 times.
as long as it's Tuesday and it's raining flicker the lights in the den Loops typically have some post-fix phrase that occurs after the list of actions to take. The system is flexible to handle if the action occurs before the list in pre-fix, and/or a split with part of the action occurring before the list of actions and some part after.

A few simple examples of the phrases that may be used to perform loops expressed in BNF are:
(do|repeat|perform) [that|this]<number> times (do|repeat-|perform) [that|this] (until|unless|as long as|while) condition expression
(until|unless|as long as|while) condition expression
(until|unless)<duration>[has passed]

Practical phrases may be made more complex. As a user may invent a novel phrasing, a mechanism is set to automatically detect the use of unrecognized phrases and save those in a central repository so the local system and/or global system may expand its coverage and/or vocabulary. This process may require user approval even when the system makes a good guess and/or high confidence level as to the purpose of the phrase.

In the case where the iteration condition is at the end of the list of commands it is desirable to accept certain words at the beginning of the list to improve human understandability. Common words for this purpose in English include "repeatedly" and "continuously". Other words like "repeat" may be used assuming the natural language interpreter may handle the required changes in verb form. For example:
repeatedly turn down the kitchen light a little bit until it is dimmer than 10%
using "repeat" becomes:
repeat turning down the kitchen light a little bit until it is dimmer than 10%

A fairly complex set of actions may be created without resorting to a computer language using these conditional and looping constructs.

Persistence Across System Failures. When a scene is using looping constructs or executing actions over a prolonged period of time, it is possible that the system may fail during the execution of the scene. One example of such failure is a power glitch.

It is important that the system be able to resume upon restart in these instances. In one embodiment, the system records the current state of execution of the scene in a persistent storage such as a database, a file or flash ram. Then on start up the system reads the data from the persistent storage and restarts execution where it failed.

Example steps supported for persistence across system failures include:
1. When scene execution begins, it is recorded that the scene is active in a persistent store and the recordation indicates that scene execution begins on step one. The time that this was done is recorded as well;
2. The next step of the scene is executed, and the persistent store is updated to indicate execution of said next step with a date/time stamp;
3. The above is repeated until steps are exhausted in the scene; and/or
4. After the scene completes execution, the associated information is removed from the persistent store.

Example steps supported for error recovery with persistence across system failures include:
1. At system startup, the persistent store is examined to see if any scenes were in the middle of execution when the system failed;
2. In one embodiment, a persistence limit for how long a scene may be persisted is defined. Any partially executed scenes in persistent store that are too old may be discarded based on this persistence limit. The definition of too old may be on the order of minutes or on the order of days and is implementation defined; and/or
3. Remaining scenes are restored from the persistence store to the execution process as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface configured to receive audio content associated with a verbal utterance;
   a processor coupled to the communication interface and configured to recognize and determine an operational meaning of the received verbal utterance comprising a compound input, wherein the compound input comprises a plurality of sentences, and wherein to recognize and determine comprises:
   determining that a first subset of the received verbal utterance is associated with a first input;
   determining that a second subset of the received verbal utterance is associated with a second input;
   storing a macro that associates with a scene identifier a set of commands that includes a first command associated with the first input and a second command associated with the second input, wherein a scene associated with the scene identifier is defined and stored as the macro, and wherein the macro may be invoked via a natural language; and
   testing the scene, including checking for an infinite loop.

2. The system of claim 1, wherein the processor is further configured to receive via the communication interface second audio content comprising a scene activation command.

3. The system of claim 2, wherein the processor is further configured to map the scene activation command to the scene identifier.

4. The system of claim 2, wherein the processor is further configured to execute the set of commands based at least in part on receiving the second audio content and further configured to map the scene activation command to the scene identifier.

5. The system of claim 1, wherein the processor is further configured to execute the set of commands associated with the scene identifier at a prescribed time or schedule.

6. The system of claim 1, wherein the first command controls a first controlled system and the second command controls a second controlled system.

7. The system of claim 6, wherein the first controlled system and the second controlled system each control a physical environment.

8. The system of claim 7, wherein the physical environment includes at least one of the following: a home environment, an office environment, a commercial environment, and a retail environment.

9. The system of claim 7, wherein the physical environment includes at least one of the following: an indoor environment and an outdoor environment.

10. The system of claim 7, wherein the physical environment includes at least one of the following controllable devices: light, shade, blind, audio, music, music playlist selection, music artist selection, music song selection, music album selection, video, video channel, video volume, thermostat, temperature, humidity, lock, garage door, door, gate, fountain, pool, coffee maker, fireplace, fan, relay, and shower.

11. The system of claim 1, wherein the received verbal utterance further includes a control parameter.

12. The system of claim 11, wherein the control parameter is a limitation, wherein the limitation is a temporal or spatial limitation.

13. The system of claim 11, wherein the control parameter is a sequence, wherein the sequence is a temporal or spatial sequence.

14. The system of claim 13, wherein the processor is further configured to determine a parameter from the received verbal utterance, wherein the parameter is a temporal or spatial parameter.

15. The system of claim 13, wherein the processor is further configured to include in the set of commands an internal representation of logic to implement the sequence.

16. The system of claim 15, wherein the internal representation of logic includes stopping execution of a first command on a first system and beginning execution of a second command on a second system based at least in part on a punctuation mark associated with the first subset and the second subset.

17. The system of claim 15, wherein the internal representation of logic includes stopping execution of a first command on a first system and beginning execution of a second command on the first system based at least in part on a punctuation mark associated with the first subset and the second subset.

18. The system of claim 15, wherein the internal representation of logic includes a transition, wherein the transition is trigger-based or event-based, and wherein the transition is based other than or in addition to time.

19. A method, comprising:
   receiving audio content associated with a received verbal utterance;

recognizing and determining an operational meaning of the received verbal utterance comprising a compound input, wherein the compound input comprises a plurality of sentences, and wherein to recognize and determine comprises:

determining that a first subset of the received verbal utterance is associated with a first input;

determining that a second subset of the received verbal utterance is associated with a second input;

storing a macro that associates with a scene identifier a set of commands that includes a first command associated with the first input and a second command associated with the second input, wherein a scene associated with the scene identifier is defined and stored as the macro, and wherein the macro may be invoked via a natural language; and testing the scene, including checking for an infinite loop.

20. A computer program product, the computer program product being embodied in a non-transitory computer readable storage medium and comprising computer instructions for:

receiving audio content associated with a received verbal utterance;

recognizing and determining an operational meaning of the received verbal utterance comprising a compound input, wherein the compound input comprises a plurality of sentences, and wherein to recognize and determine comprises:

determining that a first subset of the received verbal utterance is associated with a first input;

determining that a second subset of the received verbal utterance is associated with a second input;

storing a macro that associates with a scene identifier a set of commands that includes a first command associated with the first input and a second command associated with the second input, wherein a scene associated with the scene identifier is defined and stored as the macro, and wherein the macro may be invoked via a natural language; and testing the scene, including checking for an infinite loop.

* * * * *

UNITED STATES PATENT AND TRADEMARK OFFICE
CERTIFICATE OF CORRECTION

PATENT NO. : 11,017,772 B1
APPLICATION NO. : 16/427060
DATED : May 25, 2021
INVENTOR(S) : Gill et al.

Page 1 of 1

It is certified that error appears in the above-identified patent and that said Letters Patent is hereby corrected as shown below:

In the Specification

In Column 6, Line(s) 19, delete "Sam" and insert --8am--, therefor.

In Column 6, Line(s) 22, delete "Sam" and insert --8am--, therefor.

In Column 6, Line(s) 32, delete "Sam" and insert --8am--, therefor.

In Column 9, Line(s) 4 - 5, delete "(beautiful outside outdoor back)" and insert --(beautiful | outside | outdoor | back)--, therefor.

In Column 12, Line(s) 31, after "sought", delete "." and insert --;--, therefor.

In Column 16, Line(s) 59, delete "if (Hour(Now( )>6 && Hour(Now( )<10) d.volume*=0.8;" and insert --if (Hour(Now( ) ) > 6 && Hour(Now( ) ) < 10) d.volume *= .8;--, therefor.

In Column 16, Line(s) 61, delete "LOAM" and insert --10AM--, therefor.

Signed and Sealed this
Fourth Day of October, 2022

Katherine Kelly Vidal
*Director of the United States Patent and Trademark Office*